H. F. RUDD.
PNEUMATIC CUSHION.
APPLICATION FILED JULY 20, 1912.
1,141,360.
Patented June 1, 1915.
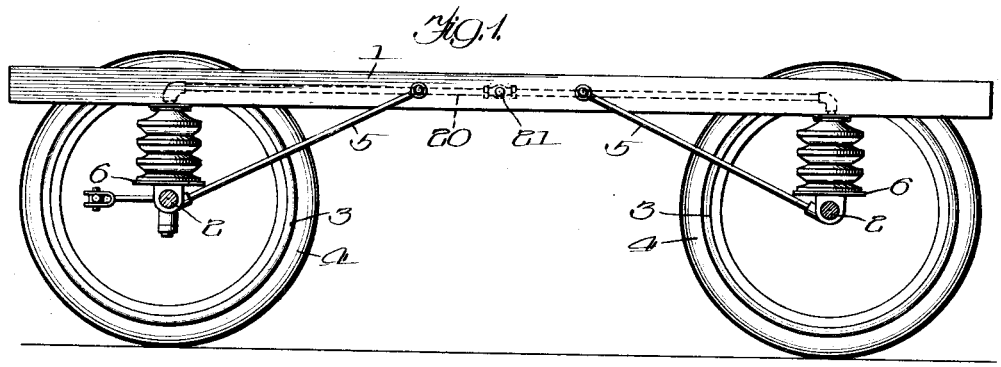
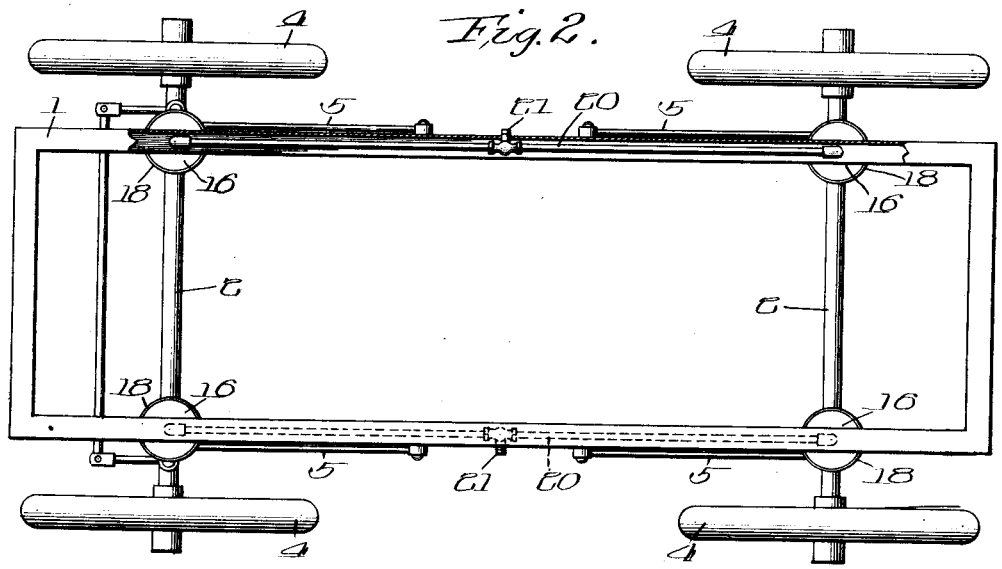
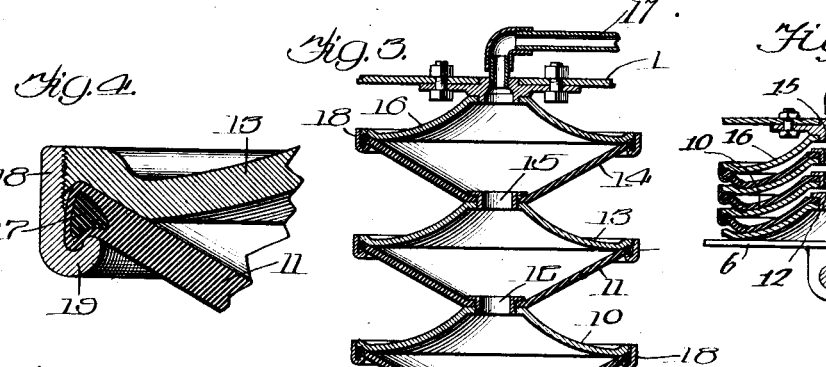
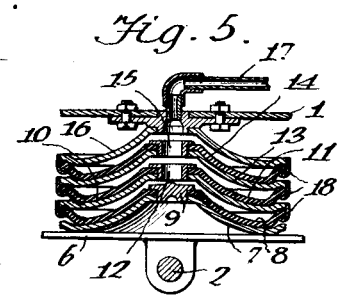
Witnesses:
Jno. H. Nelson Jr.
Edwin B Nelson
Inventor:
Herbert F. Rudd.
By G. L. Cragg
Atty.

UNITED STATES PATENT OFFICE.

HERBERT F. RUDD, OF BELPRE, KANSAS.

PNEUMATIC CUSHION.

1,141,360.  Specification of Letters Patent.  Patented June 1, 1915.

Application filed July 20, 1912. Serial No. 710,585.

*To all whom it may concern:*

Be it known that I, HERBERT F. RUDD, citizen of the United States, residing at Belpre, in the county of Edwards and State of Kansas, have invented a certain new and useful Improvement in Pneumatic Cushions, of which the following is a full, clear, concise, and exact description, reference being had to the accompanying drawings, forming a part of this specification.

My invention relates to pneumatic cushions which may be of particular service in supporting vehicle bodies upon vehicle running the preferred embodiment thereof but to restricted to this adaptation.

The various objects and advantages of my invention will be fully explained by reference to the accompanying drawing showing the preferred embodiment thereof but to which embodiment the invention is not to be limited.

In the drawing Figure 1 is a side view in elevation of as much of a vehicle as is necessary to illustrate one use to which the invention may be put; Fig. 2 is a plan view of the structure shown in Fig. 1; Fig. 3 is a sectional elevation of a device constructed in accordance with the invention showing the cushion units in fully distended relationship; Fig. 4 is a sectional view showing a detail of construction; and Fig. 5 is a view similar to Fig. 3 with the exception that the parts are shown under full compression.

Like parts are indicated by similar characters of reference throughout the different figures.

I have shown a vehicle body frame 1 which is mounted upon vehicle axles 2 through the intermediation of the pneumatic cushions of my invention. The vehicle may be equipped with wheels 3 having solid cushion tires 4. The axles are suitably maintained apart by means of brace rods 5 intervening between the vehicle body frame and the axles.

Cushion platforms 6 are carried by the axles 2. Each platform 6 carries a rigid abutment 7 which is substantially conically shaped, the conical surface of this abutment being preferably slightly concaved. A resilient cushion element 8 rests upon the abutment 7, this resilient element being dish shaped and bulging outwardly, the bulged portions of the abutment 7 and resilient element 8 being in engagement. The bulged portion of the dish shaped element is preferably of conical shape. An imperforate flanged coupler 9 passes through the central opening in the dish shaped element 8 into threaded engagement with the upper portion of the abutment 7, the coupler 9 clamping the resilient element 8 with sufficient firmness upon the abutment as to prevent escape of air at this point. Another rigid abutment 10 rests upon the top of the resilient element 8. A second resilient element 11 rests upon the top of the abutment 10 and is secured in alinement therewith by means of a hollow flange coupling 12 which serves so securely to hold the elements 10 and 11 together as to prevent seepage of air laterally of the structure. The elements 10 and 11 may be constructed similarly to the elements 7 and 8, these elements 10 and 11 bulging toward each other and engaging each other at their bulging portions, these bulging portions being preferably of substantially conical formation with the conical surface of the element 10 slightly concaved. A rigid abutment 13 rests upon the top of the element 11 and engages a resilient element 14, the elements 13 and 14 being united by a hollow flange coupling 15, the inter-relation and formation of the parts 13, 14 and 15 being similar to the inter-relation and formation of the parts 10, 11 and 12. A rigid abutment 16 rests upon the top of the resilient element 14 and engages the vehicle body frame 1 as illustrated most clearly in Fig. 3. The cushion structure, as it is illustrated, includes three complete units whose interiors are in communication as the flange couplings 12 and 15 are hollow. I do not limit myself, in all embodiments of the invention, to a multiplicity of such units, nor to their use in supporting vehicle bodies upon vehicle wheels.

The abutment and resilient element of each cushion unit are desirably hermetically connected at their engaging peripheral portions by means of the construction illustrated in Fig. 4 where I have shown adjoining peripheral portions of the two main parts of the cushion unit, say the parts 11 and 13. The peripheral portion of the resilient element 11 is shown as being provided with a ring 17 that has the shape, in cross section, of an inverted heart. This ring is desirably made of substantially incompressible hard rubber while the balance of the resilient element 11 is preferably made of composite rubber and fabric to make the same sufficiently pliable and sufficiently resilient to perform its function. A clamping ring 18 is in threaded engagement with the rigid metallic abutment 13, this clamping ring having an insetting lip 19 that projects upwardly into engagement with an overhanging peripheral portion of the associate cushion element 11 along an annular line below the ring 17 as indicated in Fig. 4. By turning the ring 18 upwardly the elements 11 and 13 may be securely clamped in position as will readily be seen from the description which has been furnished in connection with Fig. 4.

As the invention is illustrated in connection with a four wheeled vehicle, there are four complete cushion structures distributed as illustrated in Figs. 1 and 2. The interiors of the two complete cushion structures on each side of the vehicle are thrown into communication by means of a pipe 20, one upon each side of the vehicle. These pipes 20 may be provided with nipples 21 for the attachment of an air pump whereby air under pressure may be forced into the interiors of the cushions. The pipes 20 serve to effect the distribution of shocks to which each connected cushion is subjected.

In Fig. 3 the elements of a cushion are shown in the relative positions and in the shapes they have in the absence of material external pressure and due to the natural resilience of the resilient elements 8, 11 and 14. When the cushion structures are under certain pressure they may be partially compressed to have the shapes illustrated in Fig. 1, the cushion structure serving to hold the air under pressure whereby this air may operate through the cushion structures in supporting the vehicle body, the device of my invention enabling me to dispense with the employment of pneumatic tires where desirable. In the cushion of my invention each of the units thereof affords less resistance to external pressure when its conically shaped resilient element is not materially compressed, this resistance increasing as the compression of the resilient element increases owing to the increase in area of contact between the conical portion of such resilient element and its abutment, this increase being made gradual by the conical formation of the abutment as well as by the conical formation of the resilient element, the concaving of the conical formation of the abutment serving to improve the control of this increase of area of contact and thereby the control of the supporting power and elasticity of the cushion. It is of course understood that the resilient elements are preferably substantially alike and that they will be compressed and will distend substantially simultaneously and equally, and as their compression progresses it is of course understood that the confined air is an agency that furnishes the increasing opposition and the support, the resilient elements and their abutments constituting the means through which this air operates. The multiplication of the contact surfaces, consequent upon the introduction of a plurality of alined cushion elements in each cushion structure, enables me to secure a range of cushion expansion and compression of several inches in the direction of alinement of the cushion units and in which direction the cushions operate to support the weight carried thereby, whereby the proper degree of elasticity under vehicle weight adapted to the cushions and proper resistance against shocks are afforded. The abutments are desirably of conical formation to permit the apex portions thereof to enter the cushion portions and project beyond the planes of the bases of the cushion portions where they are anchored whether the apices of the cushions are normally above such bases or below the same, the abutments and cushion elements being relatively proportioned to permit of this result. The abutments 10, 13 and 16 constitute mountings engaging the base portions of the resilient elements 8, 11 and 14, these mountings being dished to permit the opposing parts 9, 12 and 15 to project beyond the planes of the bases of the dish shaped element. By this arrangement the vertical range of compression and distention is increased.

The elasticity and the supporting power of a pneumatic cushion may be said to depend upon the force of air pressure within the cushion in conjunction with the area of surface exposed to external pressure. The cushion of my invention properly employs these two factors in its operation. When the cushion is distended substantially to its full limit the smallest external pressure surface that is capable of supporting the weight is employed, this surface varying in proper ratio with relation to the shocks and weight imposed.

While I have herein shown and particularly described the preferred embodiment of my invention, I do not wish to be limited to the precise details of construction shown as changes may readily be made without departing from the spirit of the invention.

Having thus described my invention, I claim as new and desire to secure by Letters Patent the following:—

1. A pneumatic cushion structure including a plurality of alined communicating resilient dish shaped elements; abutments between which such plurality of dish shaped elements are interposed; and an abutment interposed between adjacent dish shaped units.

2. A pneumatic cushion structure including a plurality of alined communicating resilient dish shaped elements; abutments between which such plurality of dish shaped elements are interposed; and an abutment interposed between adjacent dish shaped units, the communication between said dish shaped elements being established through the abutment intervening between the same.

3. A pneumatic cushion structure including a plurality of alined communicating resilient dish shaped elements bulging in the same direction; abutments between which such plurality of dish shaped elements are interposed; and an abutment interposed between adjacent dish shaped units, the abutments that engage the bulging portions of said resilient elements themselves bulging toward said resilient elements, the bulging portions of the resilient elements engaging the bulging portions of the abutments.

4. A pneumatic cushion structure including a plurality of alined communicating resilient dish shaped elements bulging in the same direction; abutments between which such plurality of dish shaped elements are interposed; and an abutment interposed between adjacent dish shaped units, the communication between said dish shaped elements being established through the abutment intervening between the same, the abutments that engage the bulging portions of said resilient elements themselves bulging toward said resilient elements, the bulging portions of the resilient elements engaging the bulging portions of the abutments.

5. A pneumatic cushion structure including a plurality of alined communicating resilient dish shaped elements substantially conically shaped and bulging in the same direction; abutments between which such plurality of dish shaped elements are interposed; and an abutment interposed between adjacent dish shaped units, the abutments that engage the bulging portions of said resilient elements themselves being substantially conically shaped and bulging toward said resilient elements, the bulging portions of the resilient elements engaging the bulging portions of the abutments.

6. A pneumatic cushion structure including a plurality of alined communicating resilient dish shaped elements substantially conically shaped and bulging in the same direction; abutments between which such plurality of dish shaped elements are interposed; and an abutment interposed between adjacent dish shaped units, the communication between said dish shaped elements being established through the abutment intervening between the same, the abutments that engage the bulging portions of said resilient elements themselves being substantially conically shaped and bulging toward said resilient elements, the bulging portions of the resilient elements engaging the bulging portions of the abutments.

7. A pneumatic cushion structure including an outwardly bulging resilient dish shaped element and an abutment having a bulging portion engaging the bulging portion of the dish shaped element, the bulging portion of the abutment being generally of conical formation with its conical surface concaved, the abutment and resilient dish shaped element being relatively proportioned to permit the abutment to project beyond the plane of the base of the dish shaped element when under sufficient compression.

8. A pneumatic cushion structure including an outwardly bulging substantially conically shaped resilient element and an abutment having a bulging portion engaging the bulging portion of the resilient element, the bulging portion of the abutment being generally of conical formation with its conical surface concaved, the abutment and resilient dish shaped element being relatively proportioned to permit the abutment to project beyond the plane of the base of the dish shaped element when under sufficient compression.

9. A pneumatic cushion structure including a plurality of alined resilient dish-shaped elements having a constantly open avenue of communication therebetween that is restricted with respect to the cushion interiors.

In witness whereof, I hereunto subscribe my name this 18th day of July A. D., 1912.

HERBERT F. RUDD.

Witnesses:
G. L. CRAGG,
ETTA L. WHITE.